United States Patent [19]

Smith

[11] 4,401,237
[45] Aug. 30, 1983

[54] APPARATUS FOR MONITORING FEED OF GRANULAR MATERIAL

[75] Inventor: Anthony R. Smith, Stockertown, Pa.

[73] Assignee: Bethlehem Steel Corporation, Bethlehem, Pa.

[21] Appl. No.: 225,560

[22] Filed: Jan. 15, 1981

[51] Int. Cl.³ .............................................. G01F 23/24
[52] U.S. Cl. .................................. 222/56; 73/304 R; 324/158 P; 340/617
[58] Field of Search ................. 222/56, 64; 73/304 R, 73/861.08, 290 R; 340/612, 615, 617, 620; 324/61 P, 65 P, 158 P

[56] References Cited

U.S. PATENT DOCUMENTS

| 2,541,576 | 2/1951 | Detuno | 73/304 |
|---|---|---|---|
| 3,124,771 | 3/1964 | Rohrback | 338/13 |
| 3,184,970 | 5/1965 | McNelly | 73/304 R |
| 3,893,027 | 7/1975 | Veenendaal | 324/158 P X |
| 4,318,042 | 3/1982 | Eda et al. | 324/158 P X |

Primary Examiner—F. J. Bartuska
Attorney, Agent, or Firm—John I. Iverson; John S. Simitz

[57] ABSTRACT

Apparatus for monitoring the depth of granular material in a container or on a carrier includes a unique probe tip and complementary apparatus, which includes a support, a positioning mechanism and a cleaner, to which the tip is fastened. The probe tip is comprised of an electrically conductive metallic strip having a metallic grid attached to one end and electrical connections at the opposite end for electrically connecting the strip to electronic equipment. The strip is enclosed in an electrically insulating sheath. A section of the sheath having a known surface area and thickness and contiguous with the metallic grid is filled with electrically conducting material. The ratio of the surface area of the section to its thickness is not less than about 20. The section has a thickness of not more than about 1.0 centimeter. The electrical resistivity of the section can be between about 0.1 and 10 megohms/cm².

11 Claims, 4 Drawing Figures

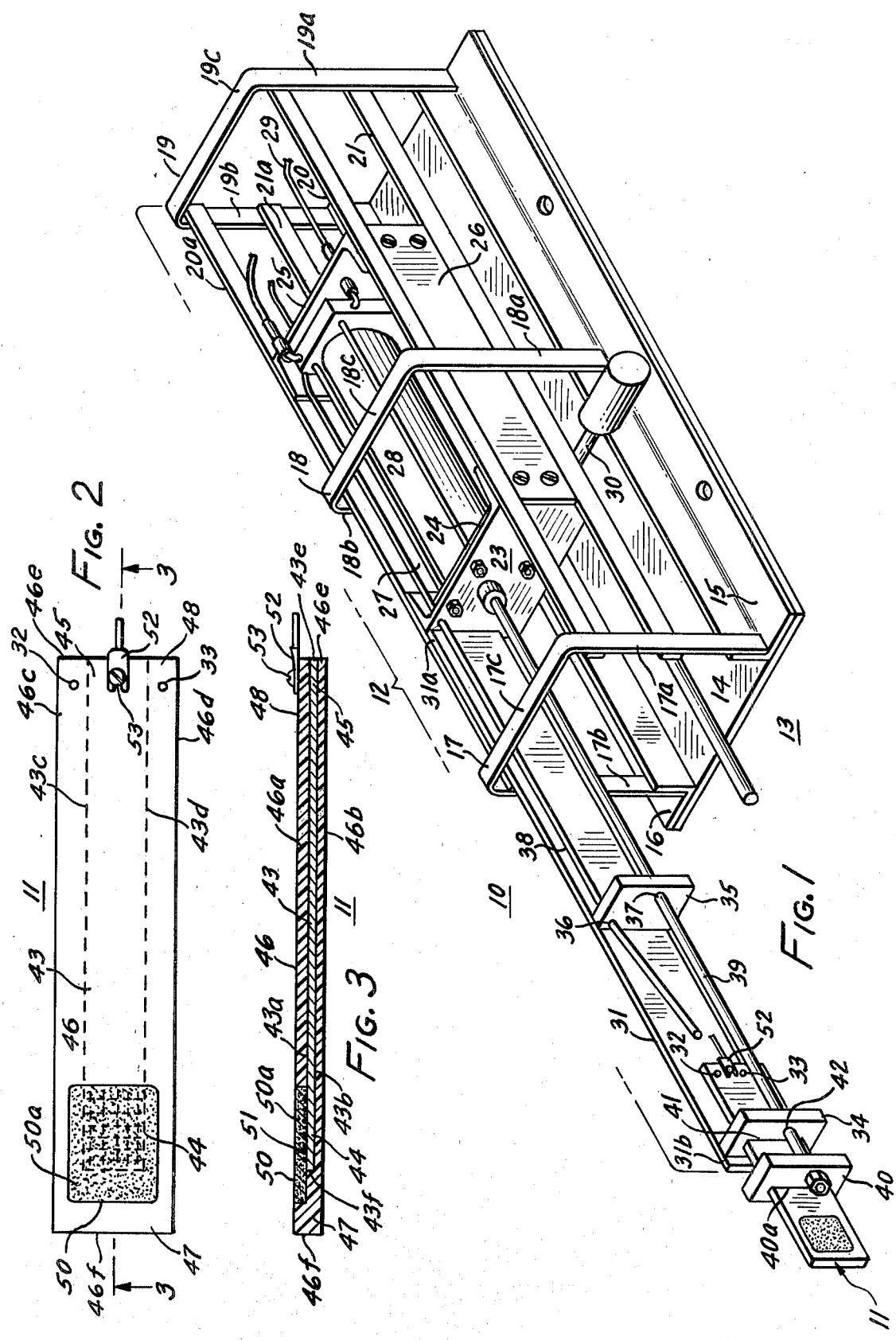

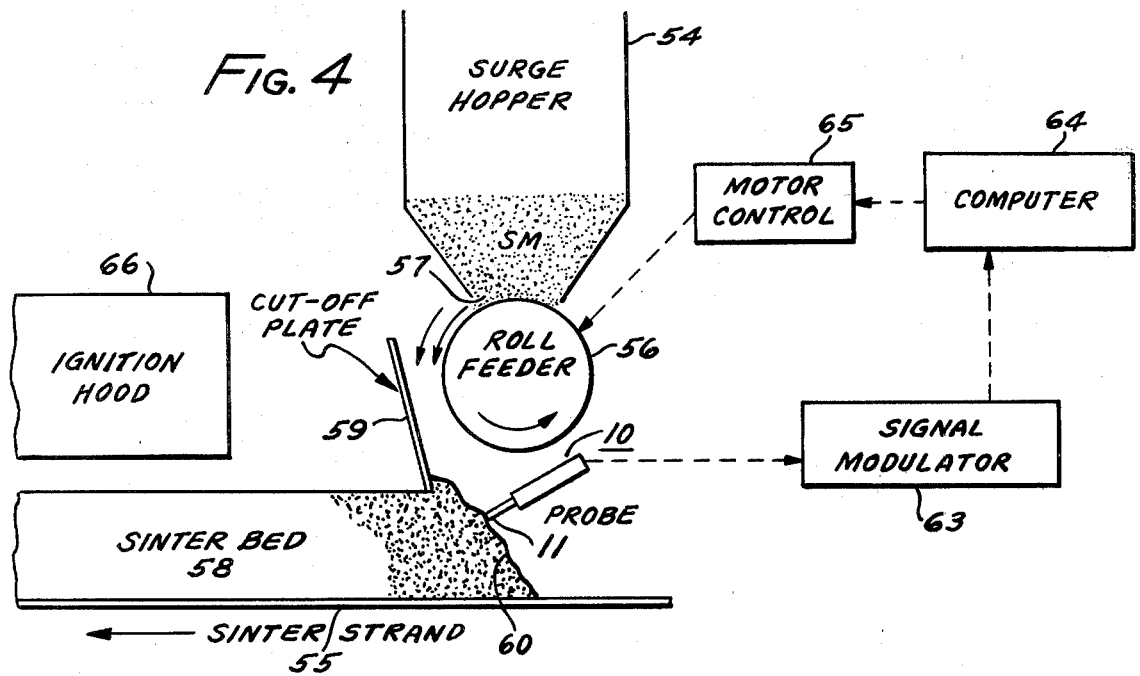

APPARATUS FOR MONITORING FEED OF GRANULAR MATERIAL

BACKGROUND OF THE INVENTION

Broadly, this invention is directed to apparatus which can be used to monitor the depth of granular material in a container or on a carrier.

More specifically, the invention is directed to apparatus which includes a unique probe tip fastened to complementary apparatus and electrically connected to electronic equipment whereby the depth of electrically conductive granular material, such as iron ore or sinter mix in a container or on a carrier, such as a sinter strand can be monitored, and which can also be used to control the rate of feed of the granular material.

Many devices have been used to determine the level of a fluid or a fluid-like granular material in a container. One such device used to indicate the level of a liquid in a container is an electrically conductive rod in series with a source of electrical energy, an indicating scale and a switch. The rod is connected to ground through the liquid and the wall of the container. The electrical resistance of the circuit is altered by the raising and falling of the liquid and the alteration of the liquid level is read on the indicating scale. As the surface area contacted by the liquid increases the resistance decreases and is shown on the indicating scale. A shoe or enlarged portion of a conductive body may be attached to the bottom of the rod to insure quick and sure contact between the rod and liquid when the rod is immersed in the liquid.

Another device used to measure the level of granular material in a hopper is comprised of electrically conductive material, such as carbon granules which are sensitive to a change in electrically conductive characteristics caused by pressure changes, enclosed in a flexible electrically insulating material, such as a tube of rubber. The device is mounted along one wall of the container. The ends of the device are connected to a bridge circuit by means of electrodes at either end of the tube. The change in pressure on the column of carbon granules by the change in height of the granular material in the hopper caused the resistivity of the carbon granules to change. The change is registered in the bridge circuit. By balancing the bridge to account for the change in the circuit, the height of the granular material can be found directly.

It has been suggested to monitor the position of a sinter mix pile on a sinter strand with a device as described in U.S. Pat. No. 3,155,277 issued to D. W. Fath et al entitled "Material Handling Control System." The device is comprised of a plurality of metallic electrical contacts positioned at predetermined intervals or distances from the sinter strand and parallel to the sinter mix pile. Since the contacts are at various distances from the pile not all the contacts are embedded in the pile at one time. When the pile touches a metallic contact, a signal of constant magnitude is generated. Hence, the position of the pile is determined only by the contacts which become embedded in the pile. The device has several serious drawbacks, namely the device depends upon a plurality of electrical contacts; the measurement of the pile is non-continuous and the accuracy of the measurement is questionable because od dust, dirt and grime which can accumulate on the contacts. The device is expensive to install and difficult to maintain. There is, therefore, a need for a simple, inexpensive, easily maintained device which can be used to obtain maximum efficiency of a sintering process.

It is an object of this invention to provide a device or apparatus including a probe tip fastened to complementary apparatus, which probe tip is electrically conductive and is characterized by having high electrical resistivity, the probe tip being electrically connected to electronic equipment whereby the depth of granular material in a container or on a carrier can be monitored and the feed of the granular material can be regulated.

SUMMARY OF THE INVENTION

According to this invention, there is provided apparatus comprised of a unique probe tip fastened to complementary apparatus which is provided with means to support, mount, clean and provide movement to the probe tip. The probe tip is electrically conductive and in combination with electronic equipment can be used to measure the depth of granular material in a container, for example a hopper, or on a carrier, for example a sinter strand and can also be used to regulate the feed of the granular material thereto.

The probe tip includes a metallic strip having a metallic grid fastened to and contiguous with its forward end and its other or back end is adapted to be connected to the electronic equipment. The strip is enclosed in a protective sheath of electrically insulating material. A plug or section of the sheath of known surface area and thickness containing electrically conductive material whereby the section is made electrically conductive and characterized by having high electrical resistivity is formed contiguous with the metallic grid. The thickness of the section is not more than about 1.0 centimeter and preferably not more than about 0.5 centimeter. The ratio of the surface area to the thickness of the section is not less than about 20. Means are provided in the back end of the tip whereby it can be fastened to complementary apparatus which is provided with means to support, mount, move and clean the probe tip.

The complementary apparatus includes a base or support and mounting means whereby the probe tip can be mounted at any desired location to the inside surface of a hopper wall or above a carrier.. Additionally, such means supports other means for holding, positioning and cleaning the probe tip. The cleaning means includes en elongated tubular member whereby air under pressure can be blown onto the tip to prevent accumulation of dust, dirt and granular material and a movable scraper whereby if any material does accumulate on the surface, it can be removed therefrom.

The probe tip in combination with the electronic equipment can be used to monitor the depth of granular material in a storage or feed container or on a carrier, for example a hopper or a sinter strand, respectively, or to regulate the feed of the granular material. When the probe tip is used to control the feed of the granular material, the probe tip is connected electrically to an electronic active filter which modulates an electrical signal received from the probe tip. The modulated signal is sent to a computer which has been programmed with a base or set signal derived during optimum operation of the strand. The computer compares the received signal with the base signal and sends an appropriate signal to a means which controls the rate of feed of the granular material.

FIGURES OF THE INVENTION

FIG. 1 is a view in perspective of the probe tip and its attendant apparatus.

FIG. 2 is a plan view of the probe tip of the invention.

FIG. 3 is a view along 3—3 of the probe tip of the invention.

FIG. 4 i a diagrammatic presentation of the probe assembly and electronic equipment used to control the rate of feed of sinter mix to a sinter strand.

PREFERRED EMBODIMENT OF THE INVENTION

The preferred embodiment of the apparatus of the invention is shown in FIG. 1. The apparatus is shown generally at 10 and includes an electrically conductive probe tip 11 fastened to complementary apparatus 12. The apparatus 12 includes a base or support 13 and mounting means comprised of a generally rectangular plate 14 and two elongated angular structural steel members 15 and 16 which are fixedly attached in parallel configuration by conventional means, for example welding, to the metallic plate 14 as shown. Three U-shaped metallic brackets, 17, 18 and 19 having legs 17a and 17b, 18a and 18b and 19a and 19b connected by bases 17c, 18c and 19c, respectively, extending generally perpendicular to the legs. The brackets 17, 18 and 19 are fastened to the structural members 15 and 6 as shown. The brackets provide a means of support for a box-like metallic cover (not shown) which is placed over the complementary apparatus to protect it from the ingress of granular material, dust, dirt and moisture. Guide means comprised of two pairs of metallic strips 20, 21, 20a and 21a are fixedly attached to the legs 17a, 17b, 18a, 18b, 19a and 19b, respectively, in generally parallel configuration. The guide means provide support for a movable carriage 23 comprised of two spaced apart parallel U-shaped channels 24 and 25 and two parallel side plates 26 and 27 perpendicuar to the channels 24 and 25 and fastened thereto. The side plates 26 and 27 are slidable contained between the strips 20, 21 and 20a, 21a respectively. An air cylinder 28 is fixedly attached within the carriage 23 to channels 24 and 25. Air under pressure is supplied to the cylinder 28 from a source (not shown) through tube 29. The movement of the carriage 23 is controlled by means of screw jack 30. A metallic extension arm 31 is attached by one of its ends 31a to channel 24 by conventional means. The other end 31b of arm 31 extends beyond the base 13. The probe tip is fastened to end 31b. The probe tip 11 is removably mounted thereon by any means, for example bolts (not shown) passed through holes 32 and 33 and fastened by nuts (not shown). Stiffening and support blocks 34 and 35 are fastened by conventional means to arm 31 to provide support for tube 38 which is passed through hole 36 and extends from a pressurized air supply (not shown) in the rear of the apparatus 12 to the rear of probe tip 11 and also for rod 39 which extends from the piston (not shown) of cylinder 28 and which passes through hole 37 in block 35 and hole 42 in block 34 and is fastened to scraper 40 as shown. Scraper 40 has a generally rectangular passage 40a which is of a size to allow the probe tip 11 to pass through the scraper. The surfaces (not shown) of passage 40a act as cleaning surfaces which when in contact with the surfaces of probe tip 11 remove accumulated material therefrom. Pressurized air can be blown through the tube 38 to clean dust or dirt from the probe tip. Block 34 is also provided with a passage 41 of a shape and size suitable to allow the probe tip 11 to pass through it thus adding support to the tip. If any granular material accumulates on the surfaces of the probe tip 11, the material is removed by applying pressurized air to the piston in air cylinder 28 to move rod 39 which in turn slides scraper 40 over the surfaces of the probe tip 11. The cleaning surfaces of passage 40a can be an abrasive material or a pad having short stiff bristles and the like which dislodge the accumulated material on the top as the scraper is passed over the probe tip 11.

The probe tip 11 as shown in greater detail in FIGS. 2 and 3 is a composite device which includes a metallic strip 43 which appears as a relatively long and narrow piece, rectangular in cross-section, and whose thickness is relatively small when compared to its length, and having two generally rectangular flat surfaces 43a and 43b (FIG. 3) which may be parallel and two pairs of opposed edges 43c and 43d and 43e and 43f (FIG. 3) which may be parallel, and a forward end 44 and a rear end 45. It is intended to include sheet and plate and cylindrical, hexagonal, oval and the like rods and bars in the term strip. The strip may be made from a metallic material, such as carbon steel, stainless steel, copper, molybdenum, brass, bronze and the like conductive materials. It is preferred to use copper or stainless steel. The strip is encased in a generally rectangularly shaped sheath 46 having a forward end 47 and a rear end 48 generally flat substantially parallel rectangular surfaces 46a and 46b (FIG. 3) and two pairs of substantially parallel opposed sides 46c and 46d and 46e and 46f, respectively. A generally rectangular section 50 of known surface area and thickness is provided in forward end 47. The section is filled with an amount of an electrically conductive filler 50a and is characterized by having high electrical resistivity. Any conductive filler may be used but it is preferred to use graphite as the particulate filler. The section 50 is contiguous with a metallic grid 51 fixedly attached to the forward end 44 of the strip 43. The section 50 is a composite plug of known surface area and thickness formed from the same or compatible material from which the sheath is made and particulate electrically conductive material. A mix of particles of the two materials is inserted into an opening made by removing a portion of the original sheath material. The section 50 is fused into place in the sheath by pressure and heat to thereby form a continuous protective coating covering the strip. The sheath may be made from any insulating material, such as thermosetting and thermoplastic materials which will resist the abrasion and heat attendant the use of the probe. It is preferred to use polyethylene. Means 52 and 53 are provided to connect the tip 11 to electronic equipment (shown in FIG. 4). Means are provided to attach the tip 11 to the asembly 10 (As shown in FIG. 1).

The probe tip may be of any desired length, width and thickness dependent upon practical considerations in its use and may be of any shape, for example cylindrical. The tip may be several meters in length when used to measure the depth of granular material in a container. A container is defined as a storage or feed hopper to which or from which granular material is fed. The tip may be short as several centimeters when used to measure the depth of granular material on a carrier. A carrier is defined as an apparatus such as a conveyor or sinter strand wherein a desired pile of granular material is carried. In any event, section 50 in the probe tip must have high resistivity, for example between about 0.1 and 10 megohms/cm². The thickness of the section should not be more than about 1.0 centimeter and preferably not more than about 0.5 centimeter and the ratio of its cross-sectional area to its thickness is not less than about 20. The total resistance ($R_T$) of the probe tip is comprised of the interfacial resistance between the granular material and the material of the section [$r_{i(g-s)}$] and the resistance of the section ($r_s$). $R_T$ can be shown as:

$$R_T = r_{i(g-s)} + r_s$$

where:

$R_T$ = total resistance in ohms, $r_{i(g-s)}$* = the resistance of the interface between the granular material and material of portion, $r_s$* = the resistance of the section.

*The magnitude of the resistance is an inverse function of the surface area of the electrically conductive section contacted by the granular material.

In operation, the apparatus of the invention is mounted at a known location on the inside surface of the wall of a hopper. The granular material is fed into the hopper and increases in depth and successively larger areas of the section come into contact with the granular material. The increased area of the section contacted by the granular material results in a reduction in the electrical resistance of the section. The resistance of the section varies directly with the surface area in contact with granular material. The resistance of the section when minimal contact with the granular material is made may be on the order of about 10 megohms. The change in resistance is transmitted to electronic equipment which measures and compares the resistance to a base or set resistance. When the resistance of the probe tip is equal to the set resistance, a means, for example an electric motor which drives a feed conveyor feeding granular material to a container, can be deactivated to stop the flow of granular material into the container. Of course, the speed of the conveyor can be regulated to control the feeding of granular material.

One illustration of the use of the probe tip is shown diagrammatically in FIG. 4. Sinter which is part of the burden charged into a blast furnace is produced by burning sinter mix in a sinter strand. Sinter mix SM is a combination of particulate iron ores too fine to be charged per se into a blast furnace. The iron ores are mixed in desired proportions to produce a sinter having a predetermined chemical composition. Fuel is added to the mix as a source of heat. Fluxstone may be added to the mix to produce self-fluxed sinter. The sinter mix is fed into a feed or surge hopper 54 positioned above the sinter strand 55. A feed roller 56 positioned beneath the discharge chute or port 57 of the hopper is turned at a predetermined circumferential speed by a motor (not shown). The speed of the sinter strand is set at a predetermined value. The depth of the sinter bed 58 on the sinter strand 55 is maintained by a cut-off plate 59 set a desired height above the strand. The apparatus 10 of the invention can be mounted above the sinter mix with the probe tip 11 positioned at a predetermined distance from the back face 60 of the pile of sinter mix on the feed end of the strand. As the strand advances the sinter mix, the pile of sinter mix is continuously renewed with fresh sinter mix from the feed hopper by the roller feeder. The speed of the roller feeder is maintained at a predetermined value for optimum production of sinter. As the sinter mix drops from the roller feeder onto the pile on the sinter strand, particles rebound from the back face of the pile. Some particles will contact the electrically conductive surface on the probe tip an an electric current having known electrical characteristics in the shape of a wave will be induced in the probe tip and conducted to the modulator 63. The modulator averages the signals and relays the signals to the computer 64. Dependent upon the signals the computer receives from the modulator, the motor control 65 is adjusted automatically or manually as desired to regulate the speed of the roller feeder to thereby control the amount of sinter mix in the pile on the sinter strand. The sinter mix is ignited by a burner (not shown) as it passes under the ignition hood 66.

I claim:

1. Apparatus used in combination with electronic equipment to monitor the depth of electrically conductive granular material in a container and on a carrier and to control the feed of the electrically conductive granular material into the container and onto the carrier, the apparatus comprising:
   (a) an electrically conductive probe tip including a metallic strip having a forward end and a rear end, a metallic grid fastened on one surface at the forward end thereof, the metallic strip and metallic grid being enclosed in a sheath of electrically insulating material, a section of the sheath having a known surface area and thickness contiguous with the metallic grid containing particulate electrically conductive material, the section being characterized by an electrical resistivity which is lower than the electrical resistivity of the remainder of the sheath and an electrical resistance that various directly with the surface area in contact with the electrically conductive granular material,
   (b) means provided in the rear end of the sheath for mounting the electrically conductive probe tip to complementary apparatus, and
   (c) means provided in the rear end of the strip for connecting the strip to attendant electronic equipment.

2. Apparatus as claimed in claim 1 connected to electronic equipment which can convert electrical signals into linear depth measurements and can record such measurements, the means of paragraph (b) comprising:
   (a) a base and support means whereby the probe tip can be fastened at a desired location in the container and over the carrier,
   (b) guide means fastened to the base and support means,
   (c) positioning and holding means slidably movable in the guide means,
   (d) holding means whereby the electrically conductive probe tip is fastened to the base and support means,
   (e) a first cleaning means mounted mounted on the positioning and holding means and terminating at the electrically conductive probe tip, and
   (f) a second cleaning means movably mounted on the positioning and holding means and encircling the electrically conductive probe tip.

3. Apparatus as claimed in claim 2 wherein the second cleaning means comprises:
   (a) an elongated rod having one end connected to a positioning and holding means,
   (b) a metallic block of predetermined thickness provided with a passage suitable to allow passage of the electrically conductive probe tip and cleaning means lining the surface of the passage whereby accumulated granular material will be removed from the surface of the electrically conductive probe tip when the block is activated by compressed air.

4. The improved probe of claim 1 in which the electrically conductive material is graphite.

5. The improved probe of claim 1 in which the metallic strip is stainless steel.

6. The improved probe of claim 1 in which the metallic strip is copper.

7. The improved probe of claim 1 in which the ratio of the surface area to the thickness of the section is not less than 20.

8. The improved probe of claim 1 in which the thicknes of the section is not more than 1.0 centimeter.

9. The improved probe of claim 1 in which the thickness of the section is not more than 0.5 centimeter.

10. The improved probe of claim 1 in which the variable electrical resistivity of the section is between about 0.1 and 10 megohms/cm$^2$.

11. The improved probe of claim 1 in which the metallic strip is made from a metallic material taken from the group consisting of carbon steel, stainless steel, copper, molybdenum, brass, bronze, the electrically conductive material is graphite, the ratio of the surface area of the section to its thickness is not less than 20 and its thickness is not more than 0.5 centimeter and its variable electrical resistivity is between about 0.1 and 10 megohms/cm$^2$.

* * * * *